United States Patent [19]

Schutte

[11] Patent Number: 5,492,628
[45] Date of Patent: Feb. 20, 1996

[54] PROCESS FOR REDUCING SLUDGE ACCUMULATION IN THE HOT WATER EXTRACTION PROCESS FOR OIL SANDS

[75] Inventor: Robert Schutte, Sherwood Park, Canada

[73] Assignees: Alberta Energy Company, Ltd.; Canadian Occidental Petroleum Ltd.; Esso Resources Canada Limited, all of Calgary; Gulf Canada Resources Limited, Toronto; Her Majesty the Queen in right of the Province of Alberta, as represented by the Minister of Energy and Natural Resources, Edmonton; HBOG-Oil Sands Limited Partnership, Calgary; PanCanadian Petroleum Limited, Calgary; Petro-Canada Inc., Calgary; Mocal Energy Limited, Calgary; Murphy Oil Company Ltd., Calgary, all of Canada

[21] Appl. No.: 319,000

[22] Filed: Oct. 6, 1994

Related U.S. Application Data

[63] Continuation-in-part of Ser. No. 112,075, Aug. 26, 1993, abandoned.

[30] Foreign Application Priority Data

Jun. 11, 1993 [CA] Canada ................................. 2098622

[51] Int. Cl.$^6$ ............................................. C02F 1/52
[52] U.S. Cl. ...................... 210/696; 208/391; 210/697; 210/710; 210/712; 210/747
[58] Field of Search ................................ 208/390, 391; 209/5; 210/696–701, 710, 711, 712, 724, 747

[56] References Cited

U.S. PATENT DOCUMENTS 2,980,600  4/1961  Kelley .................................... 208/11
3,401,110  9/1968  Floyd et al. .......................... 208/11
3,526,585  9/1970  Camp .................................. 208/11
3,931,006  1/1976  Baillie et al. ......................... 210/46
3,953,318  4/1976  Baillie et al. .................... 208/11 LE
4,201,656  5/1980  Sanford ......................... 208/11 LE
4,425,227  1/1984  Smith ................................... 209/5
4,486,294  12/1984  Miller et al. .................. 208/11 LE

FOREIGN PATENT DOCUMENTS 289058  4/1929  Canada .
621844  6/1961  Canada .
918590  1/1973  Canada .

OTHER PUBLICATIONS

P. V. Rosewarne and A. A. Swinnerton—Report of laboratory investigation of the cold water separation of bitumen from Alberta bituminous sand—1948.

Primary Examiner—Peter A. Hruskoci
Attorney, Agent, or Firm—Millen, White, Zelano & Branigan

[57] ABSTRACT

A dispersant, such as sodium silicate, is added to the process water of the hot water extraction process which recovers bitumen from oil sands. The dispersant disperses the ultrafine (less than 300 nm) particles, to reduce the formation of flocs and sludge in the tailings pond. The volume of the pond is such that the retention time of process water is sufficiently short (less than 6 weeks when using sodium silicate) to avoid reforming flocs from the dispersed ultrafines. The ultrafines content in the process water builds up as the water is repeatedly recycled from the pond to the extraction process. The ultrafines content stabilizes at a steady state concentration as some ultrafines are continuously removed from the process water when the tailings are delivered onto the "beach" of the pond and become trapped in the sand.

4 Claims, 9 Drawing Sheets

FIG. 8

PROCESS FOR REDUCING SLUDGE ACCUMULATION IN THE HOT WATER EXTRACTION PROCESS FOR OIL SANDS

CROSS REFERENCE TO RELATED APPLICATION

This application is a continuation-in-part of application 08/112,075, filed Aug. 26, 1993, now abandoned.

FIELD OF THE INVENTION

This invention relates to a method for reducing the accumulation of sludge in the tailings pond of a hot water extraction process plant for recovering bitumen from oil sand.

BACKGROUND OF THE INVENTION

At the time of filing this application, there are two very large scale, commercial plants extracting bitumen from oil sand in the Fort McMurray region of Alberta, Canada.

Oil sand comprises sand grains that are water wetted or individually coated with a thin sheath of connate water. The oil or bitumen is present as a continuous matrix in which the wet grains are embedded. In addition, clay and silt particles (termed "fines") are contained in the oil sands. These fines will pass through a 44 micron screen. Of interest in connection with the present invention, the fines include particles having a size less than about 300 nanometers (termed "ultrafines").

The bitumen is extracted from the oil sand using the hot water extraction process. This process is described in the prior art literature and, in the case of the plant owned by the present assignees, involves:

Conditioning the oil sand by mixing it with hot recycled process water and a small amount of process aid (commonly NaOH) in a rotating horizontal drum (termed a 'tumbler'). Steam is sparged into the produced slurry to ensure that the exit temperature is about 80° C. In the course of conditioning, the viscous bitumen is heated and is separated from the sand grains; it is released into the water phase in the form of minute flecks. At the same time, small air bubbles are entrained in the slurry. Fine bitumen flecks coalesce and form larger globules that contact and coat air bubbles, thereby becoming buoyant;

The product slurry leaves the tumbler and is screened, to remove oversize material;

The screened slurry is then "flooded" or diluted with additional hot water to produce a slurry containing about 50% solids by mass, based on the original oil sand feed;

The diluted slurry is then retained in a large thickener-like vessel (called a "PSV") for about 45 minutes. In this vessel, the aerated bitumen rises and is recovered as an overflow 'primary' froth product. Unaerated bitumen may be recovered in this vessel by coalescence with aerated bitumen or with the already recovered oil at the froth/water interface. The sand settles and leaves the vessel as an underflow stream containing water and some bitumen. In the mid-section of the PSV there exists a watery mixture comprising relatively non-buoyant bitumen and fines—this mixture is referred to as 'middlings';

A stream of PSV middlings is mixed with PSV underflow and the mixture is introduced into a cone settler referred to as the tailings oil recovery vessel ("TORV"). In the TORV, the feed mixture is deflected radially as it is fed in and is spread outwardly and horizontally. The out-moving mixture is contacted from below by an upwelling stream of aerated middlings. A secondary yield of froth is produced. The underflow from the TORV, comprising solids, water and some bitumen is discharged as tailings;

A stream of middlings is withdrawn from the TORV and is fed to a bank of sub-aerated flotation cells. Here the middlings are subjected to relatively intense aeration and mixing. Bitumen contained in the middlings is recovered in the form of a 'secondary' froth that is heavily contaminated with water and solids. The tailings underflow stream from the flotation cells joins the TORV tailings and the product is discharged to a tailings pond; and finally tailings is discharged to a pond and a clarified upper layer of water is recycled back to extraction as a majority of the process water.

In general then, the hot water extraction process involves mixing large quantities of recycled process water with oil sand in preparation for a first 'spontaneous flotation' step (in the PSV) to yield a relatively high quality froth and then one or more subsequent 'induced flotation' steps (in the TORV and sub-aerated cells) to yield 'secondary' froths that contain relatively higher concentrations of water and solids. An important factor in the process is therefore to maximize the proportion of the bitumen in the oil sand that is recovered in the form of primary froth. It is therefore obviously important to minimize the loss of bitumen with the tailings (comprising water, solids, and unrecovered bitumen) so as to maximize the total amount of bitumen recovered. A portion of the solids in this tailings stream forms a sludge.

As previously stated, the present invention is concerned with reducing the formation of sludge. However, any effort to reduce sludge formation needs to be compatible with seeking:

to achieve high total bitumen recovery, in the order of at least 90%, to maximize recovery of bitumen in the form of primary froth, as opposed to secondary froth, and to maintain a low bitumen loss associated with the tailings, typically below about 3%.

As a general rule, the presence of fines in the recycled process water has been considered to be detrimental. A high fines content will hinder the formation of froth and oil recoveries will be reduced.

As previously stated, the tailings are discharged into a pond, which is enclosed by constructed dykes. More particularly, the tailings from the plant are discharged onto a sloping 'beach' at the edge of the pond. As the tailings fan out across the beach, much of the sand quickly settles out and joins the beach. In the course of this, the contained tailings water and fines associated therewith are also trapped by the sand forming the beach, in a ratio of about 1 weight unit of water per 4 weight unit of mineral.

The balance of the tailings joins the pond contents. The tailings are fed in at one side of the pond and clarified water is recycled to the plant from the other side of the pond, for use as extraction process water.

At applicants' commercial plant:

The pond presently covers about 15 km$^2$ and has a present depth up to about 45 m in the deepest portions;

The sand, fines and some bitumen settle to leave a clarified top layer of water having a depth of about 5 m. This layer contains about 0.1 wt. % to 1.0 wt. % suspended solids;

The clarified water is recycled as process water after a pond retention time of about 9 months;

A "sludge" layer, of only slightly increasing density and containing only a small content of coarse solids, extends downwardly from the clarified water layer. The sludge layer presently has an average thickness of about 22 m. Its maximum solids content reaches about 30 wt. %. Typically, the sludge comprises 87% water (by volume), 1–2% bitumen and 11–12% solids. The sludge contains a high proportion of ultrafines;

At a solids concentration of about 30 wt. %, the sludge is able to trap and suspend descending coarse solids which would otherwise settle out at the bottom. Thus the bottom layer of the pond is a sludge of increasing density and coarse solids content. At the base of this layer, the solids content may reach 60 wt. %.

The volume of sludge generated is very large. Applicants' commercial plant processes about 350,000 tonnes of oil sand per day. About 0.2 m³ of sludge are produced for each tonne of oil sand processed. This sludge layer is persistent and stable, requiring an ever-increasing pond capacity. The cost of providing the dykes to contain the increasing volume of sludge is very high. Therefore it is highly desirable to densify or eliminate the sludge with the objective of reducing the volume of pond space needed and reducing the dyke cost.

Solutions to the problem have been offered in the prior art patent literature.

In general, the prior art teaches the view that the fine solids do not settle and form a dense bed because they are mutually repelling and therefore will not densify in water beyond a density in the order of 30 wt. %. The prior art solutions therefore commonly take the form of adding a flocculant to the tailings, to cause the fines to agglomerate and densify.

SUMMARY OF THE INVENTION

The present invention arose from observations made of the actions of the fines present in charges of sludge introduced into glass cylinders. It was noted that:

instead of forming a gradual consistent gradient in the distribution of the particles in the column, the sludge would separate to form an upper clarified portion and a lower solids-containing portion, with a clear demarcation between them;

when the cylinder, containing the settled charge, was tapped, the solids-containing portion appeared to move as a unit, indicating some degree of cohesiveness; and if a liter of settled sludge in a cylinder was diluted with a liter of clean water and the charge was then shaken and again allowed to settle, the particles would congregate in the same volume that the solids-containing portion had occupied prior to dilution—the added water would join the clarified water portion.

These observations, coupled with additional studies, led to the following conclusions:

that the ultrafines take the form of platelets having a radius to thickness ratio in the order of about 30:1 and having a thickness in the order of 1 to 10 nanometers; and that the ultrafines are attracted to each other and form a collection of interconnected aggregates comprised of flocs, thereby producing a thixotropic gel.

Further experiments showed that the ultrafines floc to form gels in process water at concentrations in the order of 1 g/100 g of water. When considered in isolation, particles larger than about 300 nanometers did not form gels, but exhibited hindered settling. Similarly, particles larger than about 1 micron would otherwise settle quickly and form a deposit of 55–60 wt. % solids.

The basic conclusion reached from this experimental work was that the ultrafines are "gel formers". This has heretofore been believed to be a desirable and fortunate side-effect as evidenced by the prior art's predisposition to add flocculating agents.

It was also noted that, once encouraged to disperse, the ultrafines are subject to Brownian movement and would settle only very slowly. This means that the dispersed ultrafines essentially assume a temporarily suspended state and will go where the water goes.

Further it was noted that, over time, the dispersing effect tended to diminish, resulting in a renewed tendency for the dispersed ultrafines to form flocs.

And finally, it was known, as previously stated, that part of the water in the tailings will be trapped in the beach, together with the ultrafines carried by the trapped water.

These conclusions and observations have led to a concept for modifying the conventional hot water process so as to prevent flocculation of the tailings and thus prevent the formation of gel. This is accomplished by dispersing the ultrafines using an added chemical dispersant, maintaining short pond retention times, and relying on the entrapment of ultrafines in the beach sand to stabilize the plant's recycled process water suspended ultrafines content at a generally constant value which is not so high that bitumen recoveries are adversely affected.

More particularly, the modification involves:

treating the process water delivered to the pond by ensuing sufficient dispersant enters the process water circuit to disperse ultrafines and hinder formation of flocs;

delivering the treated process water to a beach at the pond's inlet where some ultrafines are removed from the recycled process water;

withdrawing the process water and residual ultrafines from the pond's outlet for maintaining the volume of the process water in fie pond sufficiently small so that the retention time of the process water and residual ultrafines is short enough that the ultrafine particles remain in a dispersed state and are prevented from forming flocs; and repeatedly withdrawing the process water and residual ultrafines from the pond's outlet and recycling them to the plant so that the ultrafines content increases to a steady state concentration.

Preferably, the dispersant used is sodium silicate. It was noted that when sodium silicate was used that the dispersed ultrafines again began to form flocs after about 6 weeks. Therefore it is preferred that the pond retention time be less than 6 weeks and more preferably about 3 weeks.

Preferably the pond is sized such that the ultrafines content in the recycled water is stabilized at a content in the order of 4–6 wt. %.

DESCRIPTION OF THE DRAWINGS

FIGS. 6a and 6b are plots showing froth quality—more particularly, FIG. 6a shows froth bitumen content over the course of the original EEC run and FIG. 6b shows froth bitumen content over the course of a follow-up EEC run.

DESCRIPTION OF THE PREFERRED EMBODIMENT

The invention is exemplified by the experiments now described, in which an extraction of bitumen from oil sand was conducted in a pilot plant, referred to as the Experimental Extraction Circuit ("EEC"). The experiments described include an original EEC run, a follow-up EEC run specific to examining froth quality, and an ultrafines settling test.

In applicants' commercial plant, the rate of incoming solids from oil sand and recycled waters is balanced by the tailings system solids rejection rate so as to maintain a continuous, sustainable process. As previously stated, tailings are discharged onto a beach where coarse particles settle out and some water and its associated suspended fines are trapped in the interstices between the coarse particles. Remaining fines are swept with the bulk of the water phase to a tailings pond or runoff collection basin. In this basin flocculated fines settle into a sludge layer, and a small fraction of fines, below a certain diameter, remain suspended long enough to be reclaimed with the recycled water. This diameter is known as the cut point of the basin. In applicants' commercial plant, the cut point of the 15 square km pond is of the order of 450 nanometers. Methods for calculating the cut point are conventional and known.

In the EEC, in accordance with the present invention, fines were dispersed so as to discourage flocculation. The EEC was therefore unable to utilize the commercial plant's capability to reject fines via the sludge layer. The percentage of suspended fines were expected to increase as a consequence and therefore to increase the content of ultrafines in the recycled water. Thus, there were two major issues to address: could the tailings system rebalance to sustainably reject the increased load of recirculating ultrafines (achieve a steady-state ultrafines concentration); and would the increased load of ultrafines in the recycle water affect froth quality and bitumen recovery.

Figure 1:
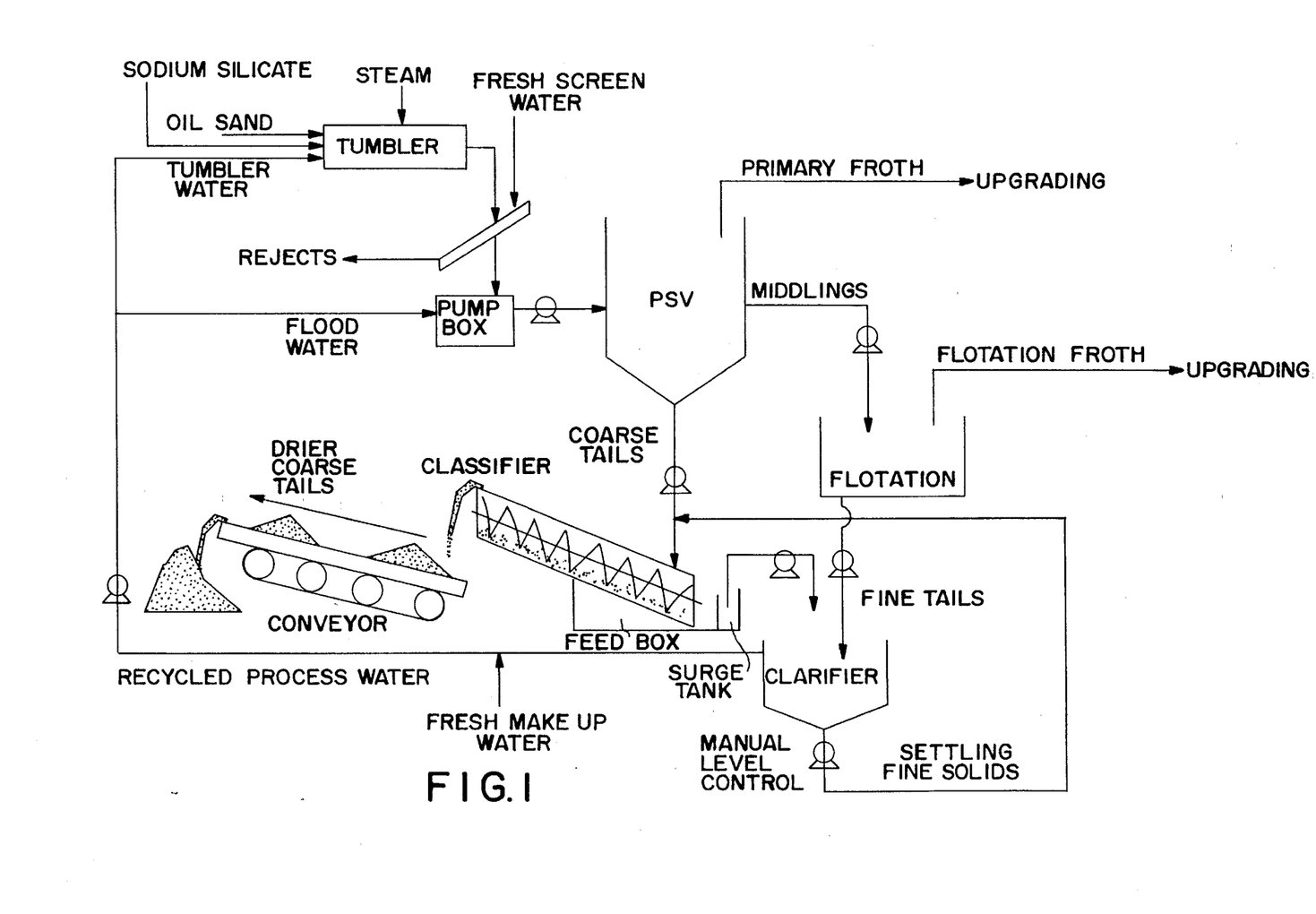
FIG. 1 is a schematic showing the EEC pilot plant used to conduct the original run proving the utility of the invention.

Having reference to FIG. 1, the EEC is seen as being basically conventional as far as the extraction portion of a commercial plant is concerned. In the original EEC run, the tailings water was treated with a classifier and a clarifier, to enable recycling of tailings water to the front end of the EEC. The classifier treated the primary separation vessel ("PSV") tailings and discharged dense tailings and a clarifier removed a portion of the coarse silt particles from the recycle water. As an objective of the experiment was to create a steady state ultrafines concentration in the total water inventory, it was necessary to keep the water to a minimum, keeping the tonnage processed and run length within practical limits. Thus, the clarifier had a relatively small diameter of 1.8 m. At a feed rate of 3 tonnes of oil sand per hour this worked out to a cut point of 14 μm. Thus a significant portion of the silt size particles (2–44 micrometer), that would normally be settled out in the commercial plant, were included in the recycle stream in the EEC.

The classifier was used to withdraw a sand tailings stream from the circuit that resembled the beach deposits in the commercial plant. This is a device that uses an upwardly inclined screw to remove a more or less cohesive mass from a reservoir in which the solids settle to a consistency comparable to a beached deposit. Difficulties in tuning the operation of the classifier resulted in inclusion of contained coarse particles and silt, in a surge tank coupled to the classifier's feedbox, that should have been removed by the screw. On two occasions, difficulties with the classifier resulted in temporary process upsets, visible in the time traces of several parameters used to monitor the process.

Figure 2:
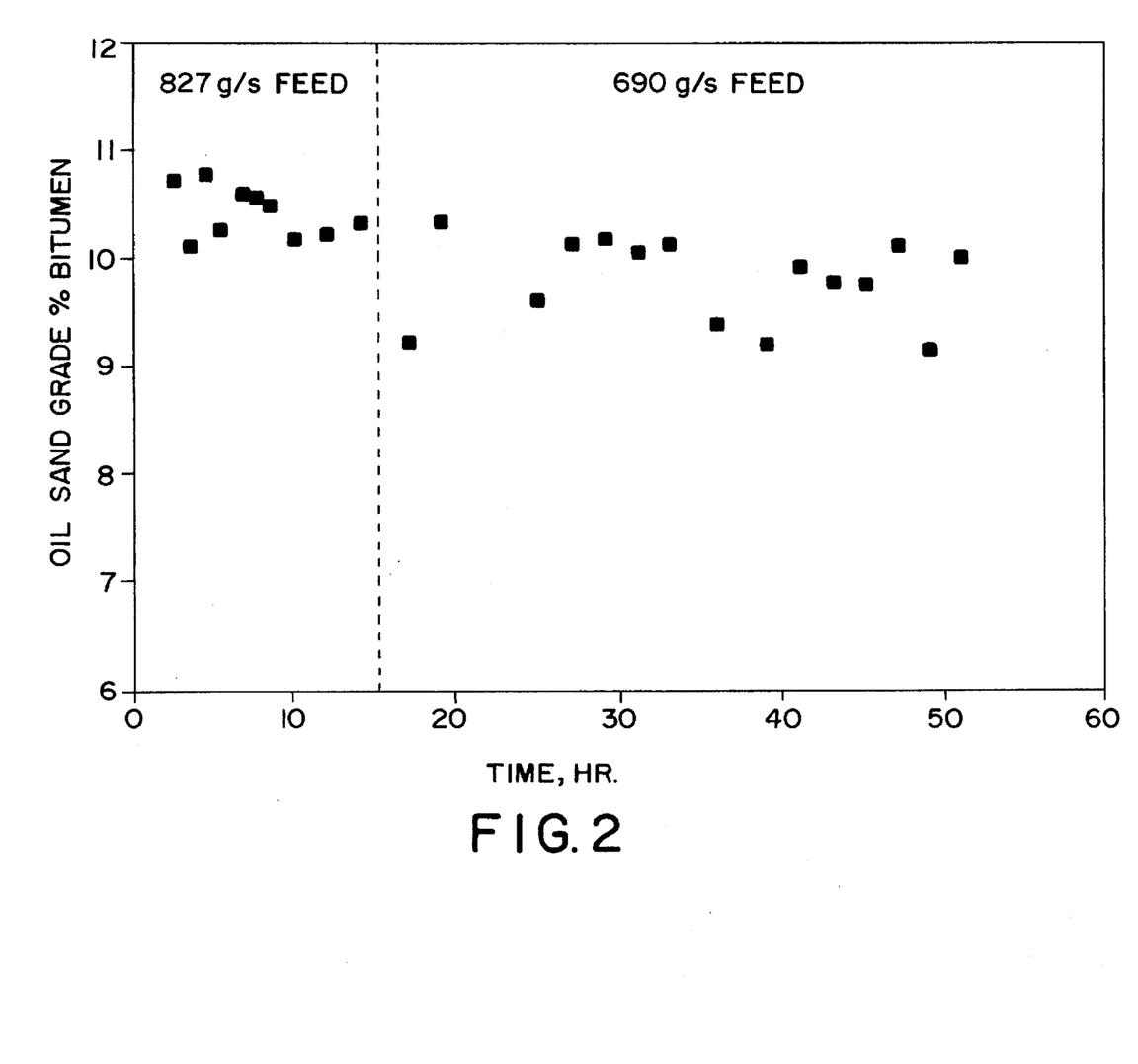
FIG. 2 is a plot showing the grade of the oil sand used in the original EEC run.

During operation of the EEC, medium grade oil sand feed was used. As shown in FIG. 2, the grade declined throughout the run. During the 52 hours of the run, feed was in for 47 hr. Tonnage processed was as follows: 15 hr @ 3.0 TPH; 5 hr @ 2.5 TPH; 4 hr feed outage; 10 hr @ 2.5 TPH; 0.5 hr feed outage; and 22 hr @ 2.5 TPH for a total of 125 tons oil sand processed.

The temperature of the tumbler outlet was set to 80° C. Flooded slurry was at 74° C. and the PSV at 70° C.

Sodium silicate "N" was added to the tumbler to act as a dispersant and to replace conventional NaOH as the caustic process aid. The sodium silicate "N" was added to the process in an amount that was equivalent to an NaOH dose of 0.04 wt. %. The presence of fine oil in the PSV middlings suggested that this dose was too high. Some emulsification may have taken place. Since Sodium Silicate "N" has a $SiO_2$ to $Na_2O$ ratio of 3.22:1, the weight of silicate (dry basis) added was 0.13 wt. % on oil sand feed.

Total water use was set at 0.55 kg/kg oil sand feed, which is typical for applicants' commercial plant. The rate at which water was recycled from the clarifier to the front end of the process was equal to the total water used less any make up water. During the period when the oil sand feed rate was reduced to 2.5 TPH, the water was adjusted to 0.65 kg/kg oil sand.

Figure 3:
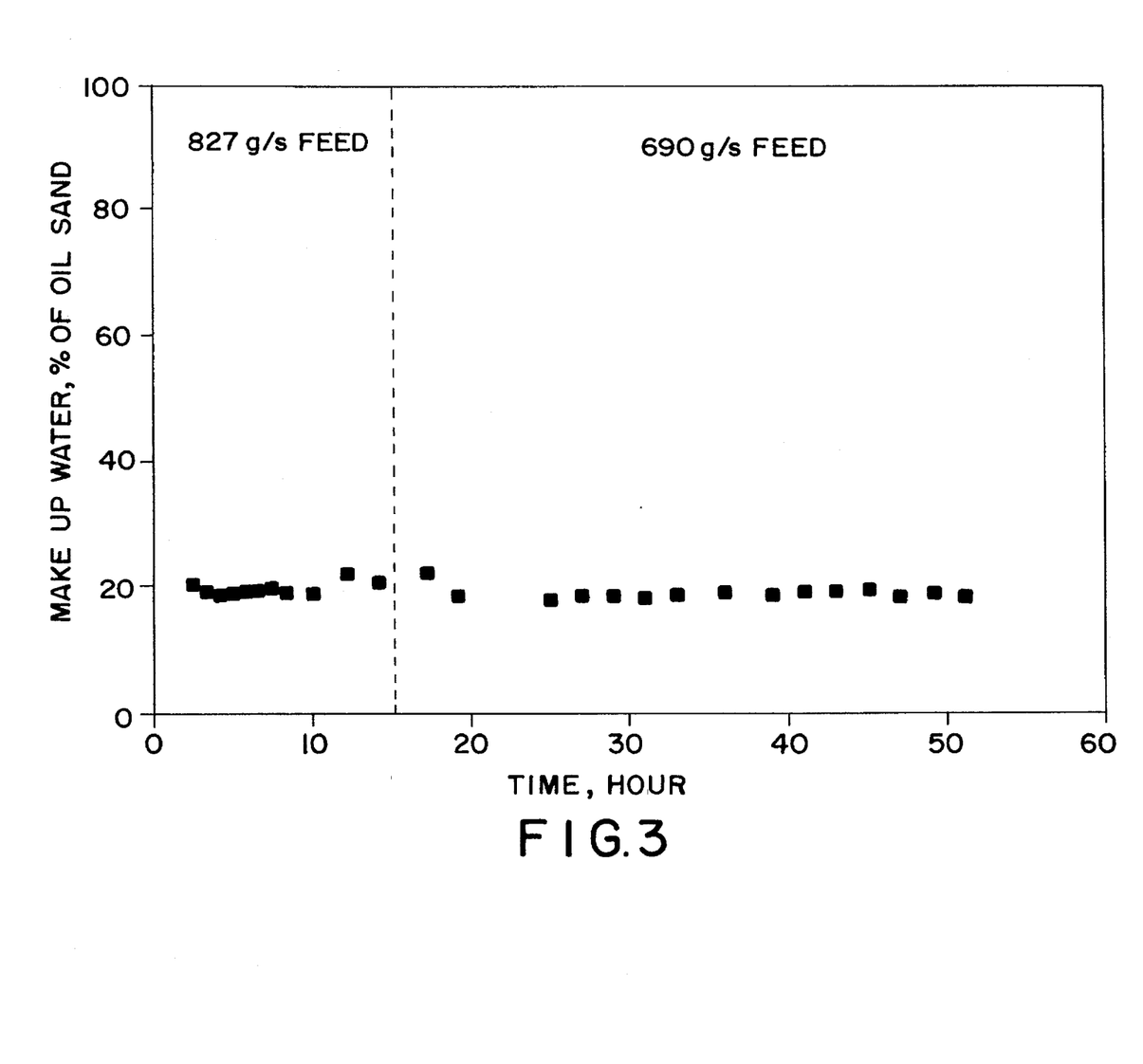
FIG. 3 is a plot of the make-up water consumed in the course of the original EEC run.

Make up water, that is the water required from an outside source to keep the processing running, balanced the amount of water that left the circuit in froth and classifier tailings. The water loss in froth was just about balanced by the water gain from the oil sand feed. Thus, the make up water quantity was about equivalent to the amount of water rejected in the final sand tailings from the classifier, averaging about 0.19 kg/kg oil sand as shown in FIG. 3. The recycle water rate was thus of the order of (0.55–0.19)=0.36 kg/kg oil sand feed for the first 15 hours and 0.46 kg/kg feed for the remainder of the run.

The present invention is based, in part, on balancing the quantity of ultrafines in the oil sand feed against the ultrafines in the water which are being included in the sand deposits from tailings i.e. in the dykes and beaches. This is automatically accomplished through a build up in the concentration of these fines, brought about by recycling the tailings pond water back to the process. It requires several cycles through the process for the concentration to reach steady state. A process cycle is a function of the EEC system residence time which is determined from the system volume and water flow rate.

The system volume included the volumes of the PSV 0.534 m³, flotation 0.191 m³, and clarifier. The clarifier comprised upper and lower portions. Above the feed inlet, the clarifier volume was 1.601 m³ and the volume below the inlet, where the coarse solids settled, was 3.203 m³. The volume of the surge tank was 0.640 m³. It had an exit half way up the side. The volume below this exit was 0.319 m³. At the end of the run, the surge tank was full of sand. Its water inventory was therefore zero.

As mentioned above, the water use in the run was 19 kg/kg oil sand or 0.57 m³/hr for the first 15 hr. The residence time of the water, as a first approximation, was equal to the volume of the vessels divided by the volumetric flow rate. Corrections were made for the volume of the froth, the coarse solids sediment in the PSV, and the solids content in the bottom part of the clarifier, which amounted to about 20% of their volume. The calculated residence time for the water phase was 8.94 hours, detailed as follows:

| Water flow rate | 0.57 m³/hr |
| --- | --- |
| Water phase volumes | |
| PSV | (0.8*0.534) = 0.427 m³ |
| flotation | 0.191 m³ |
| top of clarifier | 1.601 m³ |
| bottom of clarifier | (0.8*3.203) = 2.562 m³ |
| surge tank | (0.0*0.319) = 0.000 m³ |
| Total Volume of process vessels | 4.782 m³ |
| Residence time | (4.782/0.57) = 8.39 hours |

It can be seen that the greatest contribution to the residence time was made by the clarifier.

Figure 4:
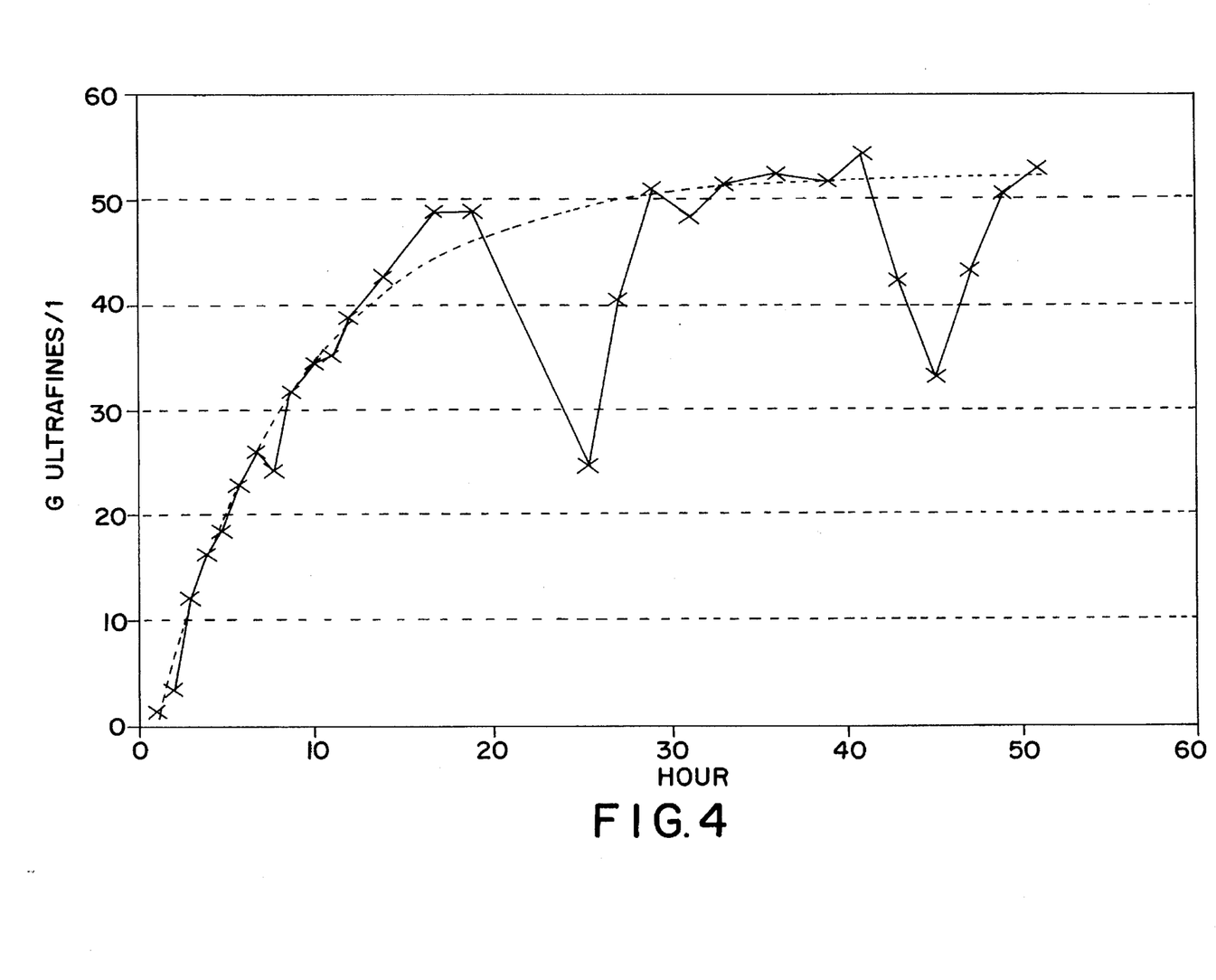
FIG. 4 is a plot of the build-up and stabilization of ultrafines concentration in the water during the course of the original EEC run.

A rule of thumb states that a process is within 95% of steady state after 3 residence times. It was therefore expected that the circuit would be "lined out" after 25 to 26 hr of continuous operation. In this respect the process behaved exemplary. As seen in FIG. 4 a best fit curve through the data nearly reached steady state after 25 hours. The corresponding best fit equation for the concentration of ultrafines gave a time constant of 8.7 hours (this is the inverse of the coefficient of time: (1/0.115)=8.70 hours, which is in good agreement with the theoretical value). What was of importance was that the process reached steady state and continued to run for a further 28 hours at this condition, proving that it was a viable process.

The best fit equation was determined to be:

$$\text{Ultrafines Conc.}(g/l) = 52.54(1 - e^{-0.115(t-0.87)})$$

where t is time in hours and 52.54 was the long term ultrafines concentration in g/l.

The steady state circulating load of ultrafines in the recycling process water stream was seen to stabilize at about 52 g/l or 5.2 wt. % (Note the two aforementioned process interruptions which appeared as two sharp dips in the curve). Knowing the quantity of non-settling fines found in the feed and knowing a typical value for the ratio of water-to-solids in the tailings sand dump or beach, one can perform a mass balance and estimate the steady state content of ultrafines which will circulate in the recycled process water.

Figure 5:
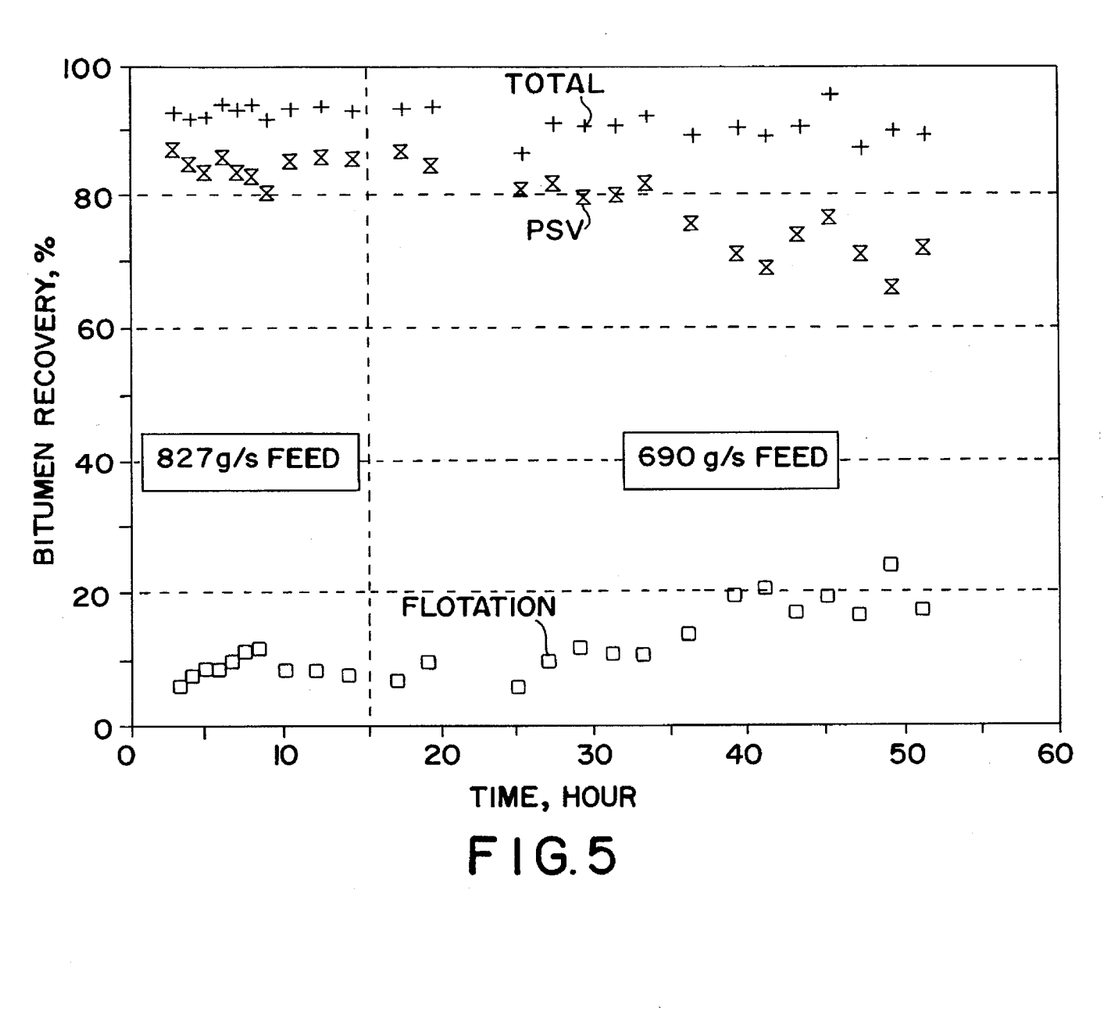
FIG. 5 is a plot of total, PSV and flotation vessel bitumen recoveries during the course of the original EEC run.

The effect of the ultrafines loading on bitumen recovery was investigated as shown in FIG. 5. For the first 15 hours the recovery was steady at about 92%. A few hours after the feed rate was reduced (to alleviate an operating problem on the overflow bin from the classifier) from 827 g ore per second to 690 g/s, there was a drop in recovery of about 3%. Recovery held steady from there on at about 89%. This indicates that the process was steady. There were no indications that recovery would not continue at this high level in spite of a circulating load of ultrafines of greater than 5 wt. %.

There was a shift in bitumen recovery from the PSV to flotation. In the latter unit previously unaerated or insufficiently aerated bitumen was recovered through attachment to fine air bubbles provided by a conventional flotation apparatus. This shift in recovery could mean that in the presence of ultrafines the bitumen droplets are smaller and less readily aerated in the tumbler. However, interpretation of this shift in recovery was made difficult because of the steady decline in oil sand grade over the length of the run.

Figure 6A:
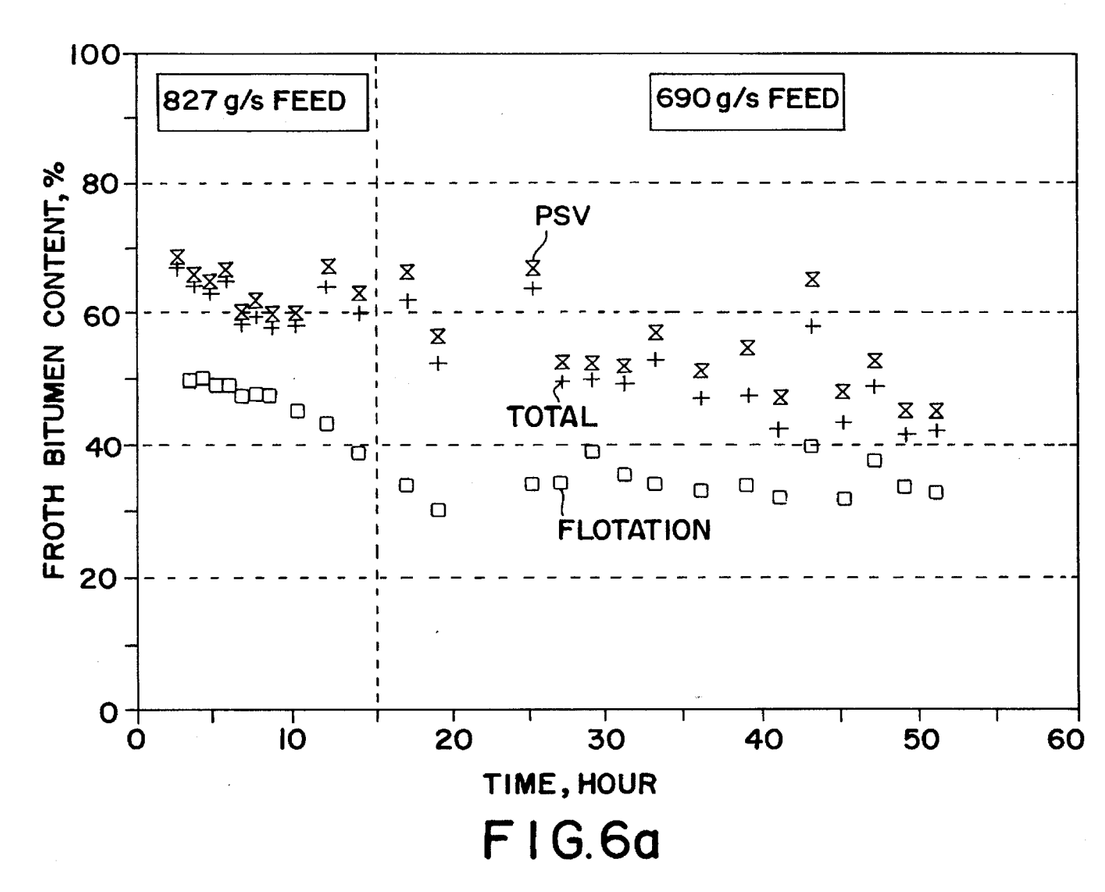

Froth from the PSV and flotation units was initially of good quality. As illustrated in FIG. 6a, the bitumen content of the froth declined steadily throughout the run. It did not appear that steady state was reached with respect to PSV froth quality. Flotation froth was steady in composition after about 15 hours. The decline in froth quality was not related to the ultrafines concentration as it had stabilized within the first 25 hours and the froth quality continued to deteriorate throughout the run.

Figure 6B:
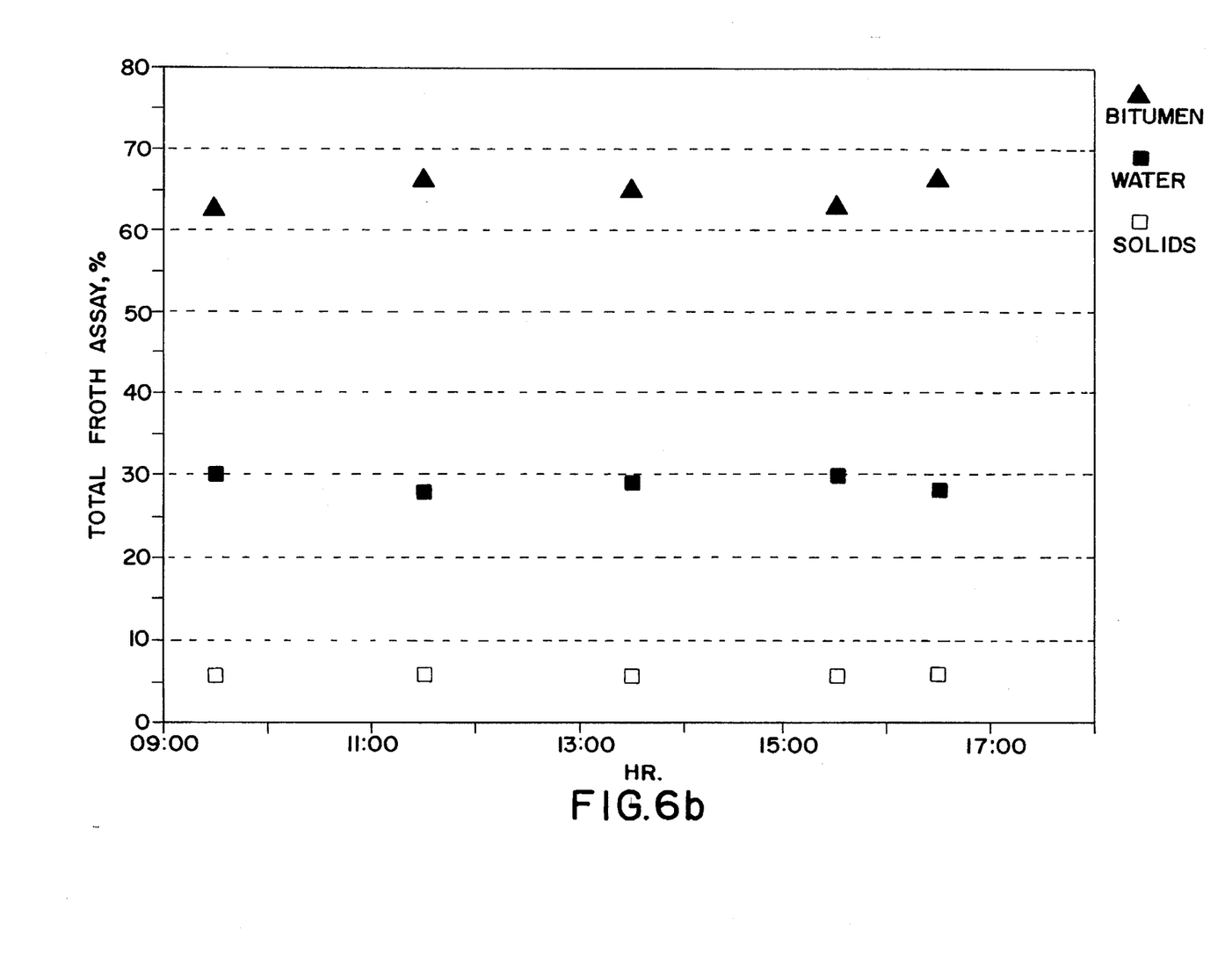

The decline in froth quality was subsequently proved to be related to a build up of silts in the circuit, resulting from the high cutpoint (~14 μm) of the clarifier. This was determined by conducting a follow-up run, directed specifically at examining froth quality, in which the classifier and clarifier were replaced by a beach which decanted into a centrifuge to remove silt but not the ultrafines. A steady froth quality from this follow-up EEC run is illustrated in FIG. 6b.

Figure 7:
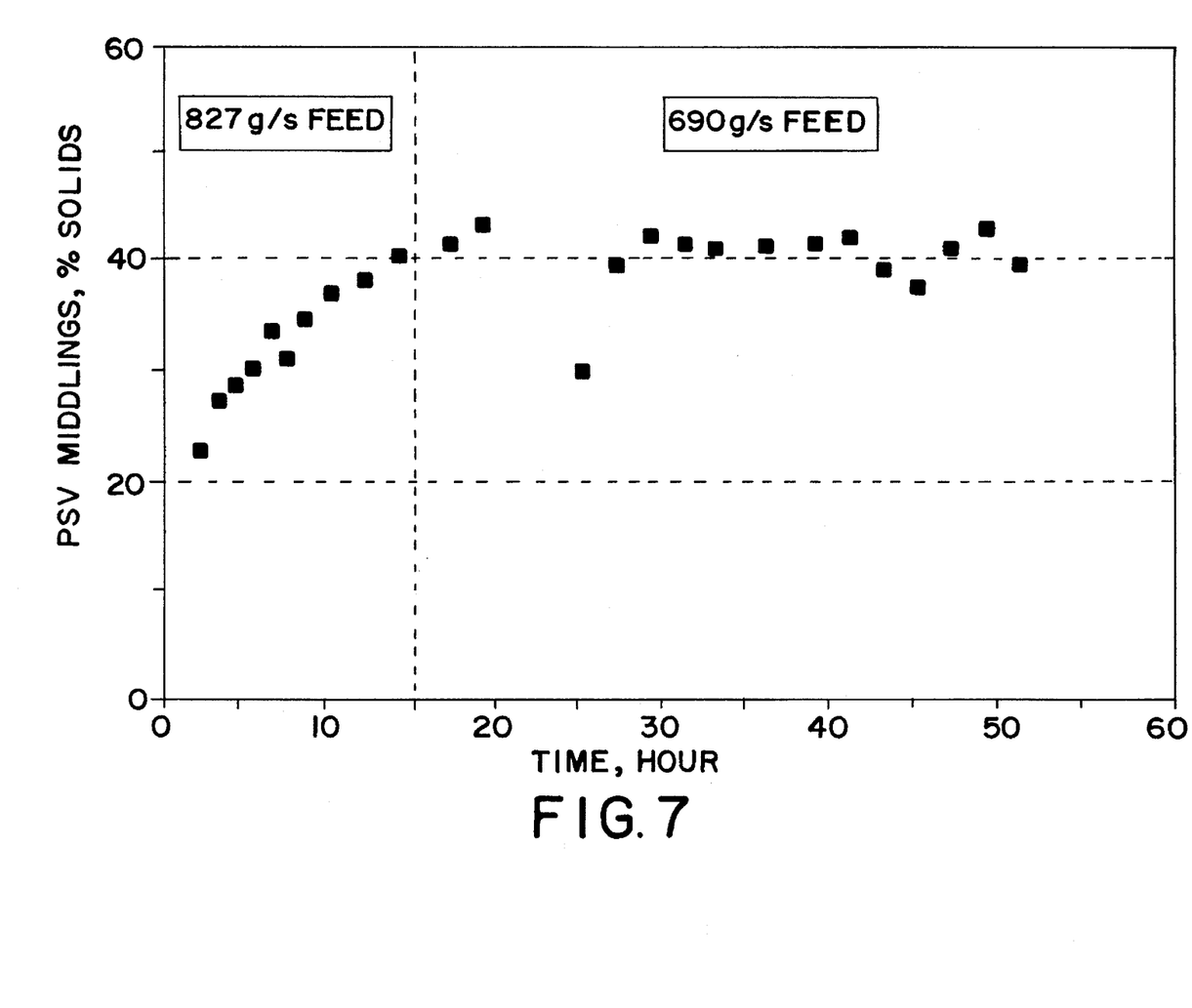
FIG. 7 is a plot showing the solids content in the PSV middlings during the course of the original EEC run.

As was mentioned above in the description of the clarifier of the original EEC run, there was a considerable silt loading in the recycle water because of the high cut point of the clarifier. It speaks well for the "thinning" characteristics of sodium silicates that the EEC remained operable at middling solids contents of over 40 wt. %, as shown in FIG. 7.

Over the past 15 years the production of sludge in applicants' commercial plant has averaged 0.2 m³ per ton of oil sand processed. In this experiment the total tonnage processed was 125 tons. Total expected sludge would thus be 0.2*125=25 m³. At the end of the run the liquid inventory was less than 7.0 m³. This volume included a liquid volume of 1.484 m³ remaining in two temporary dump bins (not shown) used during the two process upsets, the PSV, and the flotation unit.

The composition and properties of the liquid phase at the end of the EEC run were significantly different from regular tailings sludge. The accumulated liquid at the end of the run was not a waste stream but was an inventory of liquid that could be used in the processing of more oil sand in a sustainable continuous process. The run was terminated voluntarily. The liquid inventory at the end of the run was only (7.0/25*100) 28% of the volume of sludge that would normally be produced from 125 tons of oil sand. This proved that sludge accumulation was significantly reduced by the practise of the invention.

The quality of the water phase at the end of the EEC run was investigated to identify the effects of adding the dispersant. Techniques were used which were developed for the analysis of tailings sludge. Briefly, a sample was shaken for 10 minutes and immediately centrifuged under mild conditions of 200 G for 10 minutes. This separated any coarse solids into a sediment. The supernatant fluid contains the colloidal solids and some finely dispersed bitumen. This supernatant was sequentially centrifuged at increasing G values and for increasing lengths of time to separate it into fractions of decreasing particle size. The supernatant from a conventional sludge sample did not yield suspended particles after centrifugation at 91000 G for 2 hours while that taken from the silicate run showed significant suspended amounts of these ultrafine dispersed particles. In a conventional sludge, these ultrafines are aggregated together in flocs and it is these flocs that are sedimented by the centrifuge. In the presence of sodium silicate this aggregation was prevented as demonstrated by these particles not settling in the centrifuge.

Figure 8:
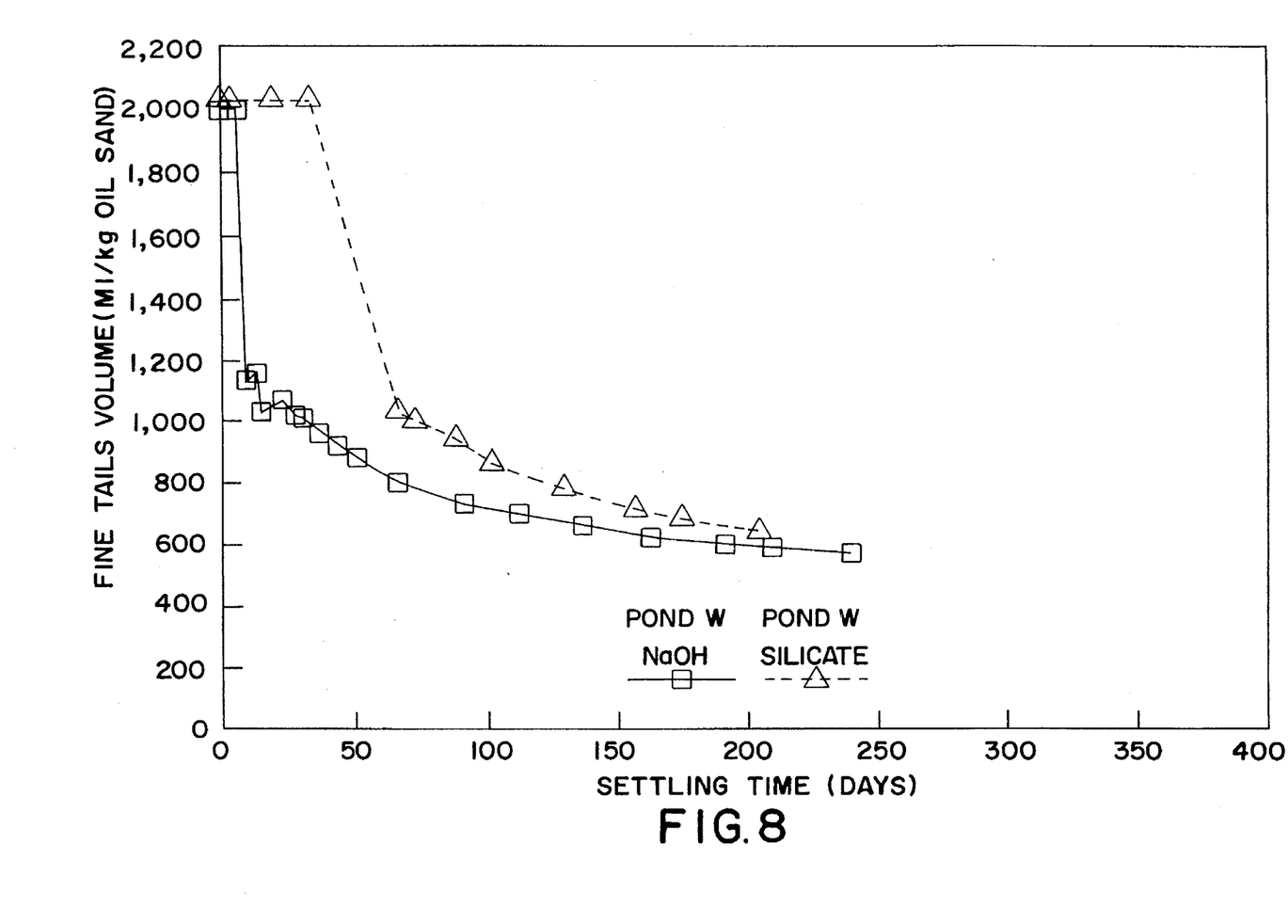
FIG. 8 is a plot demonstrating the tendency for dispersed ultrafines to reform into flocs over time.

In a separate settling experiment, the dispersing effects of NaOH and sodium silicates, and their effects on gravity settling, were investigated as a function of time. Ultrafines were added to actual clarified pond water from applicants' commercial plant. As shown in FIG. 8, ultrafines were initially suspended and then characteristically began settling out quickly over time as they formed flocs. When NaOH was added (NaOH being the caustic used in the commercial plants), the ultrafines formed floc and quickly settled in a few days. When sodium silicates were added, the ultrafines were effectively dispersed and the eventual formation of floc and settling was delayed for about 40 days, or 6 weeks.

The retention time of the EEC, at about 8.7 hours, was sufficiently short to ensure that ultrafines remained dispersed.

Total water consumption during the original EEC run, as shown in FIG. 3, illustrates that water use was steady and just under one half of actual water consumption in applicants' commercial plant. An important aspect of the invention is that it conserves water.

Ultrafines in oil sand do not constitute a constant fraction of the ore. The best estimate, based on the analysis of several samples of commercial plant sludge, puts the average concentration of ultrafines in ore at 0.9 wt. %. Assuming that the water rate to sand tailings ratio in the plant is the same as in the experimental runs (i.e. 19 kg/kg oil sand), then the content of ultrafines in the recycle water must be maintained at least at 47 g/l (4.7 wt. %) to ensure that the plant tailings system disposes of the ultrafine gel formers at the same rate as they enter the plant with the feed. In the experiments it was shown that the process operated successfully at an ultrafines content as high as 57 g/l (5.7 wt. %) in the PSV.

Other dispersants, such as sodium tripolyphosphates, may be used in place of Sodium Silicate. They have similar or better dispersing characteristics than do sodium silicates, but are currently cost prohibitive.

The benefits of the invention for the commercial operating plants are significant. At applicants' commercial plant, 135 million tonnes/year of oil sand are processed. With 0.2 m$^3$ of sludge being produced per tonne of oil sand, this equates to an additional 27 million m$^3$ of sludge per year. As noted previously, applicants' tailing pond already currently covers about 15 square km. This requires continuous construction of dykes to contain this ever increasing volume of fluid. The increasing inventory of sludge is a continuing and long-term liability.

In contrast, by using the method of the present invention, it appears that a shallow, 3 square km pond could be operated with only about a 3 week inventory of water. The 3 week inventory of water maintains a circulating load of ultrafines, at a cut point in the order of 900 nanometers, as the coarser solids and a steady state quantity of ultrafines are deposited in the beach of the pond, never requiring an increase in the fluid holding capacity of the pond.

The entire disclosures of parent application Ser. No. 08/112,075 and corresponding Canadian Application for Patent Serial No. 2,098,622, filed Jun. 11, 1993, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The embodiments of the invention for which an exclusive property or privilege is claimed are defined as follows:

1. A method of reducing sludge accumulation in a tailings pond, having an inlet and an outlet, for a hot water extraction process plant which uses a recycling circuit of process water taken from the pond to extract bitumen from incoming oil sand, said oil sand containing ultrafines of less than 300 nm, and returns the process water containing ultrafines to the pond, comprising:

treating the process water delivered to the pond by ensuring sufficient dispersent enters the process water circuit to disperse ultrafines and hinder formation of flocs which are precursors to forming sludge;

delivering the treated process water to a beach at the pond's inlet where some ultrafines are removed from the recycling circuit, leaving a residual quantity, of ultrafines dispersed in the process water returned to the pond;

withdrawing the process water and residual ultrafines from the pond's outlet for maintaining the volume of the process water in the pond sufficiently small so that the retention time of the process water and residual ultrafines is short enough that the ultrafines remain in a dispersed state and are prevented from forming flocs; and repeatedly withdrawing the process water and residual ultrafines from the pond's outlet and recycling them to the plant so that the ultrafines content increases to a steady state concentration where the quantity of ultrafine being trapped at the beach becomes substantially the same as the quantity of ultrafines being introduced with the incoming oil sand.

2. The method as set forth in claim 1 wherein:

the dispersant is sodium silicate and the retention time is less than 6 weeks.

3. The method as set forth in claim 2 wherein:

the volume of the pond is sized so that the residual ultrafine content in the pond stabilizes at a steady state concentration of about 5 weight percent.

4. The method as set forth in claim 2 wherein:

the volume of the pond is sized so that the retention time is in the order of 3 weeks.

* * * * *